March 25, 1952     C. A. WIRTANEN ET AL     2,590,286
SPOON HOLDER
Filed Nov. 9, 1948
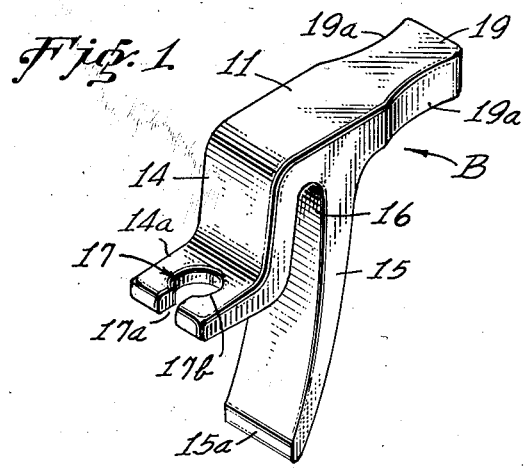
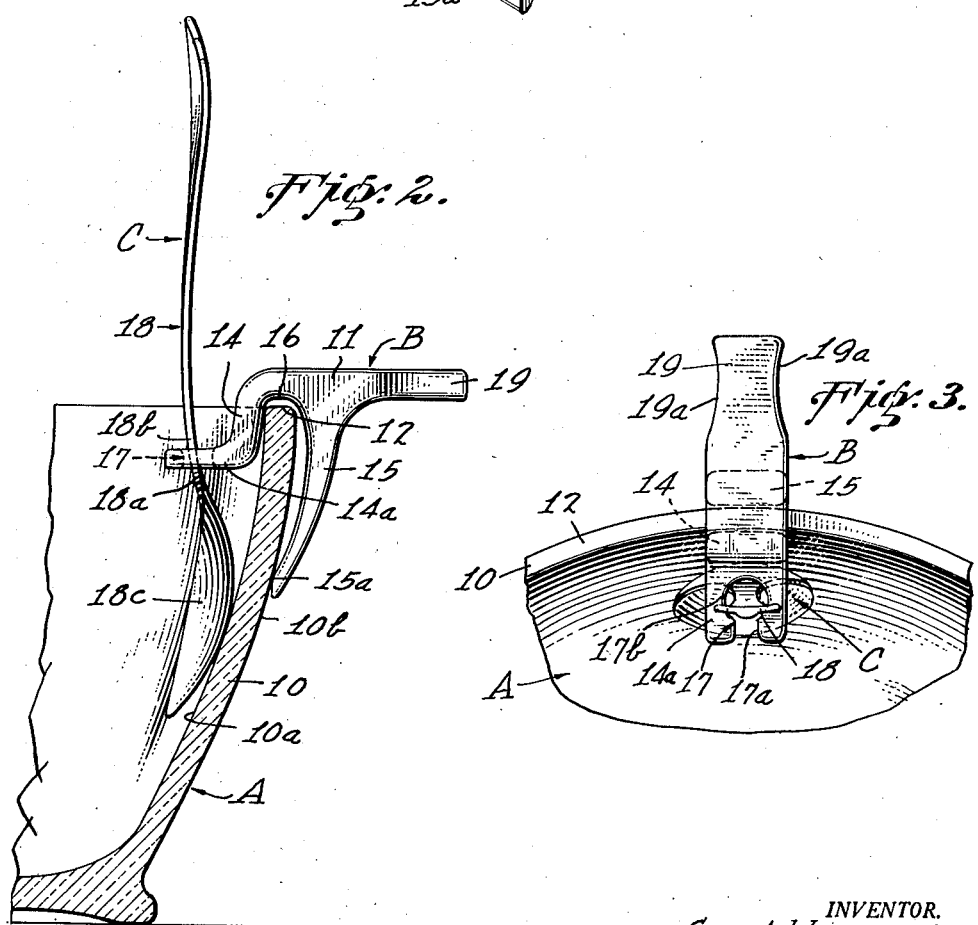
INVENTOR.
CARL A. WIRTANEN &
BY    EDITH R. WIRTANEN
Munn, Liddy & Glaccum
ATTORNEYS.

Patented Mar. 25, 1952

2,590,286

UNITED STATES PATENT OFFICE 2,590,286

SPOON HOLDER

Carl A. Wirtanen and Edith R. Wirtanen, Mount Hamilton, Calif.

Application November 9, 1948, Serial No. 59,148

3 Claims. (Cl. 65—65)

The present invention relates to improvements in spoon-holders. It consists of the combinations, constructions and arrangement of parts hereinafter described and claimed.

It is a well-known fact that a mixing spoon often slips downwardly into the contents of a bowl when the spoon is placed in the bowl and left unsupported. Frequently, the spoon will become submerged in the contents of the bowl, causing inconvenience to the cook and soiling of the spoon handle.

An object of our invention is to provide a spoon holder that may be readily and easily engaged over the rim of a mixing bowl, or the like, and utilized for removably supporting a spoon with the handle of the latter extending upwardly. Thus, the spoon will be available for instant use and protected against accidental slippage into the bowl contents.

It is further proposed in this invention to provide a spoon-holder of the character described, which is simple in construction, durable and efficient for the purpose intended, and attractive in design.

Other objects and advantages will appear as the specification continues, and the novel features of the invention will be set forth in the claims hereunto appended.

For a better understanding of our invention, reference should be had to the accompanying drawing, forming part of this application, in which:

Figure 1 is a perspective view of our spoon-holder;

Figure 2 is a vertical section taken through a mixing bowl, disclosing our holder supporting a spoon; and Figure 3 is a plan view of Figure 2.

While we have shown only the preferred form of our invention, it should be understood that various changes, or modifications, may be made within the scope of the annexed claims without departing from the spirit thereof.

Referring to the drawing, we have disclosed a bowl, or other receptacle, indicated generally at A having our spoon-holder B mounted on the annular wall 10 of the bowl so as to removably support a spoon C in substantially upright position.

More specifically described, the spoon-holder includes a bar 11 adapted to overlie the rim 12 of the bowl. This bar has a pair of spaced-apart lugs 14 and 15 depending therefrom to define a recess 16 therebetween for receiving the bowl wall 10. When the spoon-holder is mounted on the bowl, the lugs 14 and 15 rest upon the inner and outer surfaces 10a and 10b, respectively, of the bowl wall (see Figure 2).

The interiorly-disposed lug 14 has an extension 14a projecting forwardly and substantially horizontally therefrom. This extension is provided with a notch 17 therein having a narrow entrance 17a through which a reduced section 18a of the spoon handle 18 may be inserted. Also, this notch has a wider portion 17b adapted to receive and grip a wider section 18b of the spoon handle when the latter is moved downwardly in the wider portion of the notch. It will be understood that the wider section of the spoon handle could be inserted edgewise into the notch 17 and then the spoon handle turned until it is engaged by the walls of the wider section 17b.

The notch 17 is disposed vertically in the extension 14a with its wider portion 17b at such a distance forwardly of the inner bowl surface 10a that the cupped part 18c of the spoon will bear against the inner bowl surface when the spoon is arranged substantially upright. Thus, the extension 14a and the bowl A both constitute supports for the spoon, as clearly shown in Figure 2.

The bar 11 includes a handle 19 extending outwardly beyond the exteriorly-disposed lug 15. This handle is fashioned with concaved grips 19a shaped to be grasped by a person's fingers.

It will be noted that the recess 16 is sufficiently wide to receive bowl walls of various thicknesses. The lug 15 is curved so as to follow approximately the vertical curvature of the exterior surface of the bowl, and has a fulcrum 15a at its lower end designed to bear against the exterior surface 10b of the bowl.

Having thus described the various parts of our spoon-holder, the operation thereof is summarized briefly as follows:

The grips 19a are grasped by the cook, or other person, and the lugs 14 and 15 are positioned on the interior and exterior surfaces 10a and 10b, respectively, of the bowl wall 10. The recess 16 between these lugs is positioned over the wall of the bowl.

When mounting the spoon C in the holder B, the reduced section 18a of the spoon handle is inserted through the narrow entrance 17a and moved inwardly into the wider portion 17b of the handle-receiving notch. At this time, the handle 18 of the spoon is moved downwardly until the walls of the wider portion 17b of the notch grip the wider section 18b of the handle. The cupped part 18c on the spoon will bear against the inner surface 10a of the bowl wall when the spoon C is disposed substantially upright.

Thus, the spoon is retained against accidental slippage into the contents of the bowl, and the spoon is instantly available for use.

We claim:

1. A spoon-holder comprising: a bar made to be mounted across the rim of a bowl, or the like; a pair of spaced-apart lugs depending from the bar to define a recess therebetween for receiving the wall of the bowl, with one of the lugs bearing against the interior surface of the bowl wall and the other lug bearing against the exterior surface of the bowl wall; the interiorly-disposed lug having an extension projecting forwardly and substantially horizontally therefrom; the extension having a notch therein to receive a spoon handle; the bar including a handle extending outwardly beyond the exteriorly-disposed lug.

2. A spoon-holder comprising: a bar made to be mounted substantially horizontally across the rim of a bowl, or the like; a pair of spaced-apart lugs depending from the bar to define a recess therebetween for receiving an upwardly-extending wall of the bowl, with one of the lugs bearing against the inner surface of the bowl wall and the other lug arranged exteriorly of the bowl wall; the interiorly-disposed lug having a substantially horizontally positioned spoon-supporting extension projecting forwardly from the lower end thereof; the exterior lug being curved so as to follow approximately the vertical outer surface of the bowl wall, and having a fulcrum at its lower end designed to bear against the outer surface of the bowl wall; the bar including a substantially horizontal handle projecting outwardly beyond the exteriorly-disposed lug in the same plane as the bar; the handle having concaved grips fashioned in opposing side edges thereof adapted to be grasped by a person.

3. A spoon-holder comprising: a bar made to be mounted substantially horizontally across the rim of a bowl, or the like; a pair of spaced-apart lugs depending from the bar to define a recess therebetween for receiving an upwardly-extending wall of the bowl, with one of the lugs bearing against the inner surface of the bowl wall and the other lug arranged exteriorly of the bowl wall; the interiorly-disposed lug having a substantially horizontally positioned spoon-supporting extension projecting forwardly from the lower end thereof; the exterior lug being curved so as to follow approximately the vertical outer surface of the bowl wall, and having a fulcrum at its lower end designed to bear against the outer surface of the bowl wall; the exterior lug extending materially below the interior lug; the bar including a handle projecting outwardly beyond the exteriorly-disposed lug.

CARL A. WIRTANEN.
EDITH R. WIRTANEN.

REFERENCES CITED

The following references are of record in the file of this patent:

UNITED STATES PATENTS

| Number | Name | Date |
| --- | --- | --- |
| 277,304 | Maeder | May 8, 1883 |
| 979,696 | Praeger | Dec. 27, 1910 |
| 1,048,280 | Bennett | Dec. 24, 1912 |
| 1,113,918 | Trenowith | Oct. 13, 1914 |
| 1,202,676 | Cull | Oct. 24, 1916 |
| 1,306,677 | Anderson | June 10, 1919 |
| 1,717,556 | Haese | June 18, 1929 |
| 1,991,364 | Matter | Feb. 19, 1935 |
| 2,070,495 | Strutz et al. | Feb. 9, 1937 |
| 2,274,219 | Seller | Feb. 24, 1942 |

FOREIGN PATENTS

| Number | Country | Date |
| --- | --- | --- |
| 104 | Great Britain | Jan. 3, 1888 |
| 105,009 | Great Britain | May 29, 1917 |
| 391,131 | France | Oct. 23, 1908 |
| 446,062 | Great Britain | Apr. 23, 1936 |